Patented Mar. 6, 1951

2,543,820

UNITED STATES PATENT OFFICE 2,543,820

ALCOHOL PROCESS

Francis M. Archibald, Elizabeth, and Henry O. Mottern, Hillside, N. J., assignors, by mesne assignments, to Standard Oil Development Company, a corporation of Delaware No Drawing. Application December 22, 1945, Serial No. 637,060

4 Claims. (Cl. 260—639)

1

The present invention relates to an improved process for the production of aliphatic alcohol from olefinic hydrocarbons, and more particularly to a process for the manufacture of secondary aliphatic alcohols from normal olefins. The production of aliphatic monohydric alcohols through the absorption of olefinic hydrocarbons in mineral acids, such as sulfuric acid, using the cracked gases from a petroleum oil refinery as the source of aliphatic olefins, to form an acid extract which is subsequently hydrolyzed and distilled to recover the alcohol, is a widely used process.

Generally speaking, cracked gases are a heterogeneous mixture of saturated hydrocarbons, normal olefins, tertiary olefins having at least 1 carbon atom, the 4 valences of which are attached to other carbon atoms, some hydrogen and other unsaturated hydrocarbons such as diolefins like butadiene and acetlylenes. The first step toward economic utilization of cracked refinery hydrocarbons is the separation of the hydrocarbons into fractions, in which the hydrocarbons present have the same number of carbon atoms, by close fractionating. In those fractions containing hydrocarbons of 5 or more carbon atoms, the normal olefins will be both straight chain and branched chain compounds. Hydrocarbons of greater unsaturation than the mono-olefins as well as the tertiary olefins and some of the branched chain normal olefins are undesirable in the alkyl-sulfation reaction or alcohol process because a molecule of branched olefin, tertiary olefin or diolefin is capable of polymerizing either with itself or with one or more molecules of the normal olefin during the alkyl-sulfation reaction which causes a material decrease in alcohol yield and produces products which degrade the quality of alcohol.

In view of these circumstances a separation of the various hydrocarbons within a particular fraction has been attained by methods relying upon a marked difference in the reactivity of the various hydrocarbons. The means employed for eliminating the more highly unsaturated hydrocarbons which are present in minor amounts such as diolefin, have been either scrubbing with copper solution or with suspensions of specific reactants such as maleic anhydride. Of the major constituents present, it is known that the tertiary olefins are the most reactive; branched chain and straight chain normal olefins come next in the order mentioned; and the saturated hydrocarbons are the least reactive. Weak sulfuric acid has been the means used for the removal of the tertiary olefins but does not remove branched primary olefins or diolefins. As for instance, isobutylene is removed from a mixture of isobutylene and normal butene by reacting the mixture with a sulfuric acid of 62–65% acid strength on a hydrocarbon-free basis, under conditions such that little if any of the normal butenes react, or the amylene fraction may be contacted with aromatic sulfonic acid to remove the tertiary amylene. However, the above-described methods for separating the more reactive olefins, add materially to the over-all cost of the alcohol process and provide only an incomplete clean-up of the undesirable olefin. In practice, the residual tertiary olefin present in such a fraction after the weak acid wash is usually 2–15% of the total hydrocarbon. Similarly the copper chloride treatment does not remove diolefins if present below 1% concentration. When such fractions are contacted with mineral acid of sufficent strength, e. g. 83–92% $H_2SO_4$, to react with the normal olefin to give an acid extract, large amounts of polymer are formed due to the polymerization of the tertiary olefins and copolymerization of the diolefins and the tertiary olefins and normal olefins. A typical example of the extent to which tertiary olefins interfere in the alcohol process is as follows: 598 g. of $C_4$ cut naphtha containing 183 g. total olefin, about 30% on a volume basis, of which 4.89 g. or .8 Vol % was isobutylene, was contacted with 100 g. of a 1-saturation butyl extract in 88% sulfuric acid at 30° C. A 1-saturation extract is an extract containing 1 mol of absorbed olefin per mol of acid. An analysis of the products derived from this reaction showed 22.51 g. of polymer, 9.5% of the olefin recoverable as alcohol and 78.2% of the olefin unchanged. The 22.51 g. of polymer recovered indicates that considerably more olefin than the 4.89 g. of isobutylene present was converted to polymer.

The principal object of the present invention is to provide a process for producing secondary alcohols from the straight chain normal olefins of cracked petroleum products which shall substantially eliminate the loss of straight chain normal olefins due to polymerization. This and other objects of the present invention will be apparent to those skilled in the art upon reading the following description.

The foregoing objects are accomplished in accordance with the present invention by contacting a closely cut hydrocarbon fraction with a selective polymerization catalyst which will selectively polymerize branched chain mono-olefins and unsaturated hydrocarbons of higher unsaturation than mono-olefins. The branched chain mono-olefins polymerized by the process of this invention are those in which the branching or substitution of an alkyl group occurred on a carbon atom adjacent to the olefinic linkage or double bond, resulting in a tertiary type olefin such as isobutylene, 2-methylbutene-1, 2-methylbutene-2, 2-methylpentene-1, 2-methylpentene-2, etc. and those in which the alkyl substitution or branchiness occurs on a carbon atom at least one carbon removed from the olefinic linkage as found in isopropyl ethylene, 3-methylpentene-1, 4-methylpentene-1, and 1-isopropylene, etc. The unsaturated hydrocarbons of higher unsaturation than mono-olefins which are removed from hydrocarbon mixtures containing them are polyolefins such as butadiene and pentadiene, etc., acetylenic hydrocarbons and olefinic-acetylenic hydrocarbons, i. e. hydrocarbons having both olefin and acetylene linkages.

The efficiency of the procedure for selective segregation and recovery of iso and normal butenes as their polymer and alcohol derivatives respectively by acid extraction, can be improved by including a selective catalytic polymerization step. The known process for selective extraction of isobutylene from $C_4$ naphtha reduces the isobutylene concentration to 1.0–3.0%. When this quantity of isobutylene is allowed to enter the normal butene acid extraction unit, the isobutylene copolymerizes with the normal butene. In order to prevent undue loss of normal butene it is necessary to remove the isobutylene, which process is described as being part of this invention. Another impurity causing even greater loss of normal butene during the normal butene extraction process is butadiene. The presence of small amounts of butadiene causes large amounts of normal butene to polymerize. The process by which the isobutylene can be recovered by an efficient selective acid extraction and the residual isobutylene not be allowed to reduce the possibility of a high yield of normal butene products, would be the selective catalytic removal of the isobutylene between the acid extraction stages. It has been found that solid phosphoric acid catalyst on alumina is very satisfactory for the selective removal of isobutylene and butadiene. The hydrocarbon recovered from the isobutylene extraction was vaporized at low temperature to remove small amounts of polymer and acid and then passed through the phosphoric acid catalyst at about 300–320° F. and at a rate of 3–5 v./v./hr. The recovered $C_4$ naphtha contained 0.5–.7% isobutylene and zero butadiene. The following set of experiments illustrate the effect of removal of isobutylene and butadiene on polymerization of normal butene.

| Per cent Iso $C_4$ | Per cent Butadiene | Per cent n-$C_4$ Converted to Polymer | | | |
|---|---|---|---|---|---|
| In $C_4$ naphtha feed after extraction with 65% $H_2SO_4$ at 25° C. | | 88% $H_2SO_4$ Acid Extract | | Fresh 83% $H_2SO_4$ | 83% $H_2SO_4$ Acid Extract .64–.69 Satu. |
| | | .65–.69 Satu. | 1.09–1.31 Satu. | | |
| 3.0 | 1.3 | 8.8 | 11.8 | | |
| 1.6 | .9 | 9.0 | 11.3 | | |
| 3.2 | 0 | 6.3 | 5.4 | 11.9 | 3.0 |
| 1.6 | 0 | 2.8 | 0.8 | 2.4 | 0.3 |
| 1.9 | 0 | 0.4 | 0.6 | 0 | 0 |

[1] Catalytically treated naphtha.

Catalysts which have been found to be particularly applicable for the purposes of the present invention are such catalysts as solid phosphoric acid catalyst and burned natural clay like "Attapulgus" clay, also known as "Floridin." Acid activated clays such as "Superfiltrol" have a polymerizing property in this connection. The hydrocarbon mixtures from which a portion of the unsaturated hydrocarbons are to be removed by polymerization may be contacted with the polymerization catalyst in several ways, such as letting the hydrocarbon filter through a bed of the catalyst, by percolating the hydrocarbons through a bed or by fluidizing the catalyst in the hydrocarbons where the hydrocarbons are in vapor or gaseous form. Solid phosphoric acid catalysts as known to the art are produced by saturating kieselguhr, bauxite or other inert material with pyro-phosphoric acid to give a pasty mass which is formed into pellets by extrusion and then calcined at temperatures of 350–600° F. If desired, the catalyst can be made granular or powdered. Typical analysis of a solid phosphoric acid catalyst is about 62% phosphoric acid, 30% kieselguhr and 8% water. Where a burned clay catalyst is used, such catalyst is generally prepared by working into the clay until a pasty mass is obtained, which is formed into pellets and burned, or if a granular or powdered catalyst is desired, the clay paste is burned and then ground to the required size. The clay is burned at temperatures of 900–1100° F. In carrying out the process of the present invention, the hydrocarbons are contacted with the catalyst at a temperature best suited for polymerization by the particular catalyst employed and under pressure at least equal to the vapor pressure of the hydrocarbons at the temperature used. In the case of the phosphoric acid catalyst, temperatures of 300–320° F. have been found to be best suited for the selective polymerization of branched chain mono-olefins, poly-olefins and more highly unsaturated hydrocarbons. When using specially prepared natural clays, temperatures of 380–400° F. have been found to be most suitable. The polymerization step can be carried out by any convenient means, such as by contacting the hydrocarbon mixture with the catalyst in a jacketed reactor where steam or other heat transfer media can be employed to maintain the temperature within the reactor in the desired range. Contact time will range from about 10 to about 100 volumes of hydrocarbon per volume of catalyst per hour and the catalyst may be regenerated periodically by means known to the art or it can be replaced by fresh catalyst as the need for fresh catalyst arises.

The polymer formed as a result of the action of the catalyst is a hydrocarbon of 2 to 3 times the molecular weight of the feed stock. The polymer is dissolved in the unreacted hydrocarbons and is recovered by distillation and used as gasoline. After recovery from the catalyst process, the hydrocarbons are contacted with a mineral acid, usually sulfuric acid of 83–92% strength on a hydrocarbon-free basis, in the customary manner to form an acid extract which is hydrolyzed and distilled to yield alcohol. It has been found that by selectively polymerizing the branched chain mono-olefins and more unsaturated hydrocarbons the straight chain mono-olefins are left free to react with the acid absorbent of the alcohol process, and thus the yield of alcohol is increased from 10–30%. Another valuable feature of the present invention is that the alcohols thus produced are not contaminated with the product of side reactions, which when present degrade the alcohol and are difficult to remove therefrom.

The following examples will serve to illustrate more specifically the features of the present invention:

*Example 1*

A close cut $C_4$ naphtha containing 28.1% normal butenes, 13.3% isobutylene, 1.2% butadiene and 57.4% butanes was contacted with 65% sulfuric acid at 25° C. After separating the acid, the remaining hydrocarbons analyzed 32.9% normal butenes, 0.9% isobutylene, 3.47% polymer and the remainder saturated hydrocarbons. Extraction was then made with 83% sulfuric acid at 25° C. yielding an extract and spent naphtha. The spent naphtha analyzed 2.5% normal butenes, 16% polymer and the remainder saturated hydrocarbons. After hydrolysis the extract from the 83% acid process yielded 64% of the original normal butenes as secondary butyl alcohol. The polymer was recovered from the spent naphtha by fractionation. However, due to the presence of sulfuric esters and other by-products it was of inferior grade and needed purification before use.

Another quantity of the same closely cut $C_4$ naphtha as used before was passed over solid phosphoric acid catalyst at 300° F., condensed and then fractionated to remove any polymer formed. The naphtha recovered from the fractionator analyzed 25.2% normal butenes and 0.86% isobutylene. This was then contacted with 83% sulfuric acid at 25° C. The spent naphtha contained 2.4% normal butenes and 2.3% polymer. Upon hydrolysis and distillation the acid extract returned 72% of the original normal butenes as secondary butyl alcohol. The solid phosphoric acid catalyst process gave a total of 11% of polymer, which upon recovery was directly usable as motor fuel.

*Example 2*

A $C_5$ naphtha analyzing 17.9% secondary amylene and 14.1% tertiary amylene was first contacted with 70% sulfuric acid to remove tertiary olefins and then with 88% sulfuric acid at 25° C. to absorb to the secondary olefins forming acid extract. After recovering the alcohol from the acid extract and analyzing the spent naphtha, a material balance showed the following percentage disposition of the olefins based upon the total olefins present in the original $C_5$ naphtha, 15.3% as alcohol, 23.8% unreacted secondary amylene, 4.7% unreacted tertiary olefin and 56.2% of the olefins as polymer. The 15.3% of total olefin as secondary amyl alcohol is equivalent to 28.4% based upon the secondary amylene present in the original feed.

Another sample of the $C_5$ naphtha was contacted with solid phosphoric acid catalyst at 300° F. and the polymer formed removed by fractionation. The recovered $C_5$ naphtha containing 16% of secondary olefin, 0% tertiary amylene and 0% polymer was then contacted with 88% sulfuric acid at 25° C. to extract the secondary amylenes in the form of an acid extract which was hydrolyzed and distilled to recover the alcohol. Based upon the total olefin present in the original naphtha 36.4% or 65% of the original secondary amylene was recovered as alcohol, 8.9% or 15.9% of the original secondary amylene was recovered unchanged and 54% of the original olefin was converted to polymer.

What is claimed is:

1. A process for the preparation of a secondary aliphatic alcohol from normal mono-olefins which comprises treating an aliphatic hydrocarbon mixture comprising normal mono-olefins, tertiary mono-olefins, and polyolefins with a weak mineral acid whereby the bulk of the tertiary mono-olefins and polyolefins is polymerized but whereby a significant minor amount of tertiary mono-olefins and polyolefins remains unpolymerized, separating the acid and the polymers thus formed from the hydrocarbon mixture comprising normal mono-olefins and the minor amounts of tertiary mono-olefins and polyolefins, contacting the latter hydrocarbon mixture with a solid polymerization catalyst to polymerize the minor amounts of tertiary mono-olefins and polyolefins, separating hydrocarbons comprising normal mono-olefins substantially free of tertiary mono-olefins and polyolefins and contacting the same with a strong mineral acid to form an acid extract, hydrolyzing the extract and recovering secondary aliphatic alcohol from the hydrolyzed extract.

2. A process according to claim 1 in which the weak mineral acid is sulfuric acid of 62 to 70 weight per cent strength, in which the solid polymerization catalyst comprises phosphoric acid on an inert material and in which the strong mineral acid is sulfuric acid of 83 to 92 weight per cent concentration.

3. A process for the preparation of secondary butyl alcohol which comprises treating an aliphatic hydrocarbon mixture comprising normal butenes, isobutylene and butadiene with 62 to 70 weight percent sulfuric acid whereby the bulk of the isobutylene and butadiene is polymerized, but whereby a significant minor amount of isobutylene and butadiene remains unpolymerized, separating the acid and the polymers thus formed from the hydrocarbon mixture comprising normal butenes and a significant minor amount of isobutylene and butadiene, polymerizing the significant minor amount of isobutylene and butadiene by treating the latter hydrocarbon mixture with a solid polymerization catalyst comprising phosphoric acid on an inert material, separating the catalyst and the polymer so formed from the hydrocarbon mixture comprising normal butenes substantially free of isobutylene and butadiene, contacting the hydrocarbon mixture substantially free of isobutylene and butadiene with sulfuric acid of 83 to 92 weight percent concentration to form an acid extract, hydrolyzing the extract and recovering secondary butyl alcohol from the hydrolyzed extract.

4. A process for the preparation of secondary amyl alcohol from normal amylenes which comprises treating an aliphatic hydrocarbon mixture comprising normal amylenes, tertiary amylene and pentadiene with 62 to 70 weight percent sulfuric acid whereby the bulk of the tertiary amylene and pentadiene is polymerized but whereby a significant minor amount of the tertiary amylene and pentadiene remains unpolymerized, separating the acid and the polymers thus formed from the hydrocarbon mixture comprising normal amylenes and a significant minor amount of tertiary amylene and pentadiene, polymerizing the significant minor amount of tertiary amylene and pentadiene by treating the latter hydrocarbon mixture with a solid polymerization catalyst comprising phosphoric acid on an inert material, separating the catalyst and the polymers so formed from the aliphatic hydrocarbon mixture comprising normal amylenes substantially free of tertiary amylene and pentadiene, contacting the hydrocarbon mixture substantially free of tertiary amylene and pentadiene with sulfuric acid of 83 to 92 weight percent concentration to form an acid extract, hydrolyzing the extract and recovering secondary amyl alcohol from the hydrolyzed extract.

FRANCIS M. ARCHIBALD.
HENRY O. MOTTERN.

REFERENCES CITED

The following references are of record in the file of this patent:

UNITED STATES PATENTS

| Number | Name | Date |
| --- | --- | --- |
| 1,938,177 | Engs | Dec. 5, 1933 |
| 2,006,942 | Clark | July 2, 1935 |
| 2,060,143 | Griendt | Nov. 10, 1936 |
| 2,171,928 | Gage | Sept. 5, 1939 |
| 2,176,354 | Nelson | Oct. 17, 1939 |
| 2,354,261 | Hemminger | July 25, 1944 |
| 2,380,234 | Hall | July 10, 1945 |
| 2,415,951 | Kirkbride et al. | Feb. 18, 1947 |